Sept. 7, 1937.  C. H. ALLEN  2,092,628
HYDRATOR
Filed Dec. 1, 1932
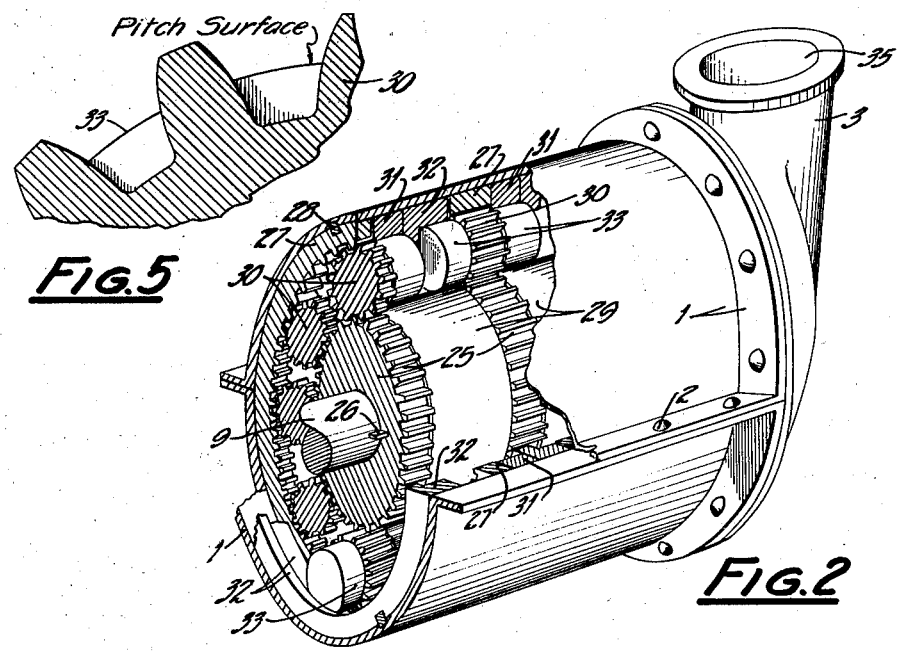
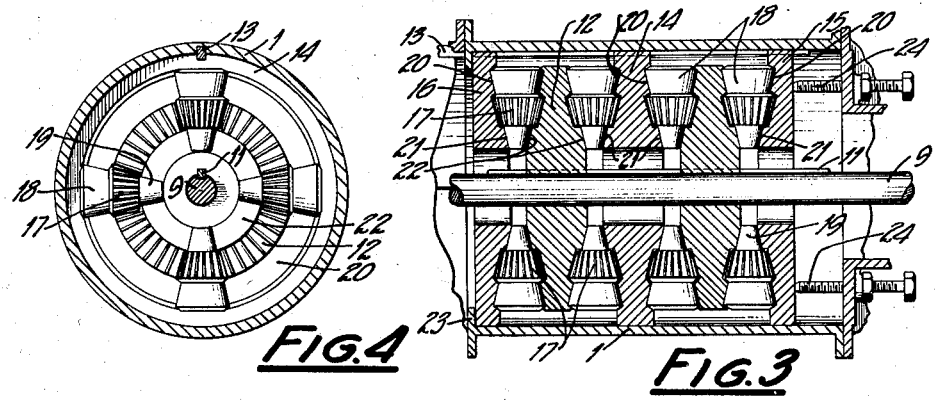
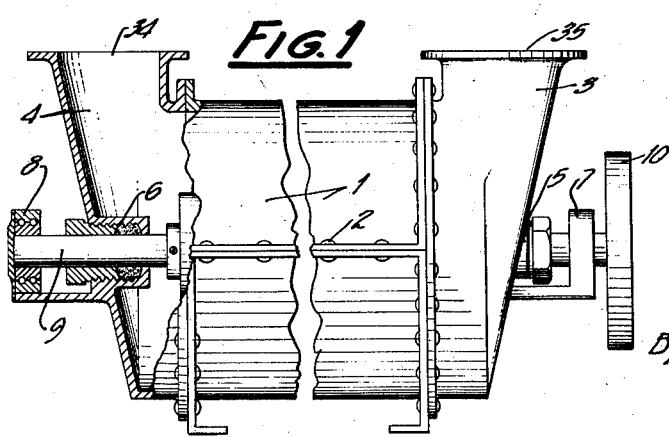
INVENTOR
CARLTON H. ALLEN
By
ATTORNEYS Patented Sept. 7, 1937

2,092,628

UNITED STATES PATENT OFFICE 2,092,628

HYDRATOR

Carlton H. Allen, Glens Falls, N. Y.

Application December 1, 1932, Serial No. 645,205

4 Claims. (Cl. 92—26)

My invention relates to hydrators, disintegrators, defiberers, refiners, blenders and the like, and particularly, but not exclusively, to devices of this character for hydrating paper pulp. Devices of the general character contemplated by my present invention have heretofore been suggested which comprise a cylindrical casing having an axially driven shaft extending therethrough. Bearing surfaces fixed against rotation are arranged in the interior of the casing and bearing surfaces are keyed and splined to the shaft which rotate therewith. Intermediate these bearing surfaces, in one type of proposed machine, are a plurality of balls so that the entire device consists of what might be termed a plurality of annular ball bearings arranged one behind the other throughout the casing. The material being hydrated is introduced into the casing at one end and the hydrated material after passing through the device is withdrawn from the other end.

Another type of hydrator has been suggested in which the fixed and movable bearing surfaces instead of being adapted to receive ball bearings therebetween are fashioned to receive conical rollers. Neither this last mentioned device nor the one utilizing the ball bearings has been successful because of the tendency to "roll up" bundles of fiber in passing through the machine. Furthermore, in a machine employing only balls or rollers there is no alternate pressure and vacuum action, such as takes place in the machine of my invention, and which, as will later be pointed out, materially increases its efficiency.

In order to reduce the possibility of fibers becoming "rolled", it has been proposed to substitute bevel gears for the respective bearing surfaces and, instead of using rollers between the surfaces to use bevel pinions cooperating with the gears, these pinions functioning substantially as planetary gears. This last proposed device has not been successful because it has been practically impossible to secure proper meshing between the teeth on the planetary gears and the other gears. This last mentioned device is not only very noisy in its operation but is commercially impracticable.

The principal object of my present invention is to eliminate the difficulties heretofore encountered in hydrators of this type and my invention includes the novel elements and the combinations and arrangements thereof described below and illustrated in the accompanying drawing in which—

Fig. 1 is a fragmentary side elevation of my device with parts broken away to show the internal construction thereof;

Fig. 2 is a fragmentary perspective view with parts of the casing broken away to show the construction of one species of my invention;

Fig. 3 is a fragmentary longitudinal sectional view of another species of my invention;

Fig. 4 is a transverse sectional view of Fig. 3; and

Fig. 5 is an enlarged view showing the relationship between the gear teeth and the bearing surfaces for the rollers for the planetary gears.

Referring to the drawing, 1 represents a cylindrical casing preferably comprising two halves secured together by suitable bolts, 2. The casing is closed at the ends by suitable caps 3 and 4 provided with stuffing boxes 5 and 6 and bearings 7 and 8 for an axial shaft 9. The shaft may be driven by a pulley 10 or any other suitable means such as a direct connected motor. In the embodiment of my invention illustrated in Figs. 3 and 4 the shaft 9 is provided with a spline or key 11 and slidably mounted upon the shaft but cooperating with the splining key 11 are the double-faced gears 12 which thus rotate with the shaft 9. The interior of the casing is also provided with a double-faced bevel gear 14 which engages a key or spline 13 secured to the interior of the casing. Also engaging the spline and fixed against rotative movement within the casing are two single faced bevel gears 15 and 16. A plurality of conical bevel gears 17 are arranged in planetary relation to the other bevel gears. There are thus provided pairs of gears cooperating with the planetary gears, one of which is rotatable and the other of which is non-rotatable. Each of these planetary bevel gears is provided with two rollers or conical bearing surfaces 18 and 19 at the respective sides of the teeth and at least partially overlie the same to form pockets in which stock is successively entrapped and from which it is extruded under pressure. These bearing surfaces are fashioned to roll on cooperating bearing surfaces, such as 20 and 21 on the fixed bevel gears 14, 15 and 16. The double faced bevel gears which rotate with the shaft 9 are also provided with bearing surfaces 22 coacting with the bearings 19. Since the planetary gears not only rotate upon their axes but roll on the bearing surfaces and on the pitch surfaces of the teeth, it is quite essential that the bearing surfaces correspond to the pitch surfaces of the teeth, otherwise, there will be an undesirable slippage or sliding between the bearing surfaces rather than a rolling movement upon each other which is desirable.

In the embodiment of my invention shown in Fig. 3 and in fact in the embodiment to be later described, it is to be understood that there may be as many sets of gears as are desirable and that in Fig. 3, for example, I have shown only four sets of planetary gears, merely to condense the drawing. The single-faced fixed bevel gear 16 abuts a flange 23 at one end of the casing and is thereby secured against longitudinal movement. Inasmuch as all of the other gears are slidable along the spline axially of the shaft 9, they are adjustably held in meshed relation by means of set screws 24 at the opposite end of the casing.

In the embodiment of my invention shown in Fig. 2, I employ spur gears instead of bevel gears but the principle of operation is essentially the same. In this embodiment of my invention comparatively large spur gears 25 are mounted upon the shaft 9 and are keyed thereto by means of the key 26. Internal gears 27 are fixed against rotation in the casing by means of the spline 28. The gears 25 are spaced on the shaft 9 by spacing rings 29 which also serve as bearing surfaces for planetary spur gears 30. These planetary gears mesh with the spur gears 25 and with the internal gears 27 in the casing. The internal gears 27 are also spaced by suitable rings 31 and 32, the inner surfaces of which serve as bearing surfaces for the rollers or bearings 33 on the planetary spur gears 30. The rollers also at least partially overlie the gear teeth to form pockets in which stock is successively entrapped and extruded under pressure in a manner similar to the arrangement previously described. One of the rings 32 is preferably made L-shaped in section to space the ends of the bearings on the spur gear. As in the case of the bevel pinions, the bearings for the planetary spur gears should be arranged to roll upon the respective bearing surfaces in the casing and on the shaft; these surfaces, therefore, should be the same as the pitch surfaces of the gear otherwise slippage or sliding will occur instead of rolling between the bearing surfaces.

It will be obvious that the casings may be made as long as desirable and as many sets of gears employed as desired.

The caps or ends of the casing 3 and 4 are provided with openings 34 and 35 for the passage of material to and from the machine.

In operation the shaft may be turned at any desirable speed and the material delivered into one end and withdrawn from the other end of the machine. Preferably, a variable speed motor controlled by a suitable rheostat is used to drive the shaft 9, and the degree to which the stock is hydrated may be varied by varying the speed of the motor; the faster the speed of rotation, the greater the hydration. In passing through the machine the material naturally fills all of the spaces between the gear teeth and as the shaft rotates, the material between the gear teeth is displaced by the teeth of the planetary gears and this constant displacement action effects a very efficient hydration of material without substantial injury to the fibers thereof. The device operates very quietly, the power required is much less than the power required to operate a jordan at equal capacity and there is no tendency to form rolls of fiber.

It will be evident from the foregoing that the hydrating, refining, disintegrating or defibering action of the machine is due to two effects; one the rolling effect which tends to flatten the fibers, broom the ends and separate them, thus increasing the felting properties of the fibers when made into paper and thereby increasing the strength of the paper; the other effect, the alternate pressure and vacuum action of the gear teeth tending to explode the fiber bundles into individual fibers and causing that mechanical-chemical result known to the paper industry as hydration. Another effect when the machine is used for paper stock is the mixing or blending action of the machine tending to secure the most intimate dissemination and uniform distribution of all the paper making elements resulting in uniform formation of the paper web with absence of spots, clots or other imperfections in the finished paper. When used for working a paper stock the machine assists in working the clay, color, alum and size into the fibers. The machine may be used for the separate hydration or refining of pulps as well as for paper stock.

It will also be apparent that my device may be said to comprise a plurality of roller bearings in which the rollers are positively secured in definite spaced relation about or around the surfaces upon which they roll and without the employment of the usual cages for this purpose. Moreover, because of the cooperating gear teeth, there can be no slippage between the rollers and the bearing surfaces with which they coact. In other words, each roller is given a positive rolling movement. This is of real advantage in bearings of this type inasmuch as it eliminates the necessity of a cage and effects a positive and substantial reduction in friction.

While I have described my invention in its preferred embodiments, it will be understood that the words which I have used are words of description rather than of limitation and that changes within the purview of the appended claims may be made without departing from the true scope and spirit of my invention in its broader aspects.

What I claim is:

1. A device of the character described comprising a casing forming a passage for the flow of material therethrough, a shaft extending axially of said casing, a plurality of first bevel gears non-rotatably mounted within said casing, a plurality of second bevel gears mounted on said shaft and rotatable therewith and alternating axially of the casing with said first gears, planetary gears meshing with said first and said second gears and means for retaining said planetary gears in engagement with said first and said second gears.

2. A device of the character described comprising a casing forming a passage for the flow of material therethrough, a shaft extending axially of said casing, a plurality of first bevel gears non-rotatably mounted within said casing, a plurality of second bevel gears mounted on said shaft and rotatable therewith and alternating axially of the casing with said first gears, planetary gears meshing with said first and said second gears, and provided with bearing members the bearing surfaces of which substantially coincide with the pitch surfaces of said planetary gears, and means forming annular bearing surfaces for the bearing surfaces of said planetary gears.

3. In a device for the treatment of pulp or paper stock, a casing, means secured to said casing and provided with alternate internal gears and smooth surfaces longitudinally of the casing, a member provided with gears and smooth surfaces located opposite the gears and smooth surfaces respectively of said casing, said casing and said member being relatively rotatable, and planetary gears provided with rollers, said planetary gears and said rollers engaging the gears and smooth surfaces respectively of the casing and said member, the ends of said rollers at least partially overlying the sides of the teeth of said planetary gears to form pockets in which stock is successively entrapped and extruded therefrom by the action of the entering teeth.

4. In a device for the treatment of pulp or paper stock, a circular casing having alternate internal gears and smooth surfaces longitudinally thereof, a generally cylindrical member located axially of said casing and provided with alternate gears and smooth surfaces facing the gears and smooth surfaces of said casing, said casing and said member being relatively rotatable, and planetary gears engaging the gear teeth of said casing and said member respectively, said gears being provided with rollers engaging said surfaces of the casing and the member respectively and at least partially overlying the sides of the teeth of said planetary gears thereby forming pockets in which stock is successively entrapped and extruded therefrom by the action of the entering teeth.

CARLTON H. ALLEN.